US011176581B2

(12) United States Patent
Abdulhayoglu

(10) Patent No.: US 11,176,581 B2
(45) Date of Patent: Nov. 16, 2021

(54) SYSTEM AND PROCESS FOR DISPLAYING MEDIA CONTENT FILES IN AN UNBLOCKABLE MANNER

(71) Applicant: Melih Abdulhayoglu, Montclair, NJ (US)

(72) Inventor: Melih Abdulhayoglu, Montclair, NJ (US)

(*) Notice: Subject to any disclaimer, the term of this patent is extended or adjusted under 35 U.S.C. 154(b) by 128 days.

(21) Appl. No.: 16/699,618

(22) Filed: Nov. 30, 2019

(65) Prior Publication Data

US 2020/0104885 A1 Apr. 2, 2020

Related U.S. Application Data

(62) Division of application No. 15/496,452, filed on Apr. 25, 2017, now abandoned.

(60) Provisional application No. 62/327,947, filed on Apr. 26, 2016.

(51) Int. Cl.
*G06Q 30/00* (2012.01)
*G06Q 30/02* (2012.01)

(52) U.S. Cl.
CPC ........ *G06Q 30/0277* (2013.01); *G06Q 30/02* (2013.01); *G06Q 30/0241* (2013.01)

(58) Field of Classification Search
None
See application file for complete search history.

(56) References Cited

U.S. PATENT DOCUMENTS

| 7,058,633 | B1* | 6/2006 | Gnagy | G06F 16/9566 |
| 8,832,276 | B2* | 9/2014 | Hind | H04L 67/2895 709/227 |
| 9,992,259 | B2* | 6/2018 | Lind | H04L 67/20 |
| 11,012,532 | B2* | 5/2021 | Magnusson, Jr. | G06Q 30/0276 |
| 2012/0324113 | A1* | 12/2012 | Prince | H04L 69/40 709/226 |
| 2016/0127435 | A1* | 5/2016 | Gritsch | H04L 67/02 709/219 |
| 2016/0253718 | A1* | 9/2016 | Carasso | H04L 63/029 705/14.73 |
| 2016/0359945 | A1* | 12/2016 | Boudville | H04L 67/04 |
| 2017/0068644 | A1* | 3/2017 | Jones | G06F 16/972 |
| 2017/0109797 | A1* | 4/2017 | Boffa | H04L 61/303 |
| 2017/0237823 | A1* | 8/2017 | Pyper | H04L 51/066 709/201 |

(Continued)

OTHER PUBLICATIONS

Sandvig, J. Christopher, Deepinder Bajwa, and Steven C. Ross. "Usage and perceptions of internet ad blockers: An exploratory study." Issues in Information Systems 12.1 (2011): 59-69. (Year: 2011).*

(Continued)

*Primary Examiner* — Michael Bekerman
(74) *Attorney, Agent, or Firm* — Joseph P. Aiena

(57) ABSTRACT

There is provided a system and process of delivering online media content files to websites which are not capable of being blocked. The system and process provides a publisher with a sub-domain name that is pointed to an IP provided by an ad server and ask publisher to update his DNS records. Concurrently, the system delivers the user a script on the newly suggested sub domain that publisher inserts in HEAD tag of web pages where it is determined that the unblockable ads are to be displayed.

6 Claims, 9 Drawing Sheets

(56) References Cited

U.S. PATENT DOCUMENTS

2017/0264712 A1\* 9/2017 Magnusson, Jr. ..... H04L 67/327
2018/0150877 A1\* 5/2018 Hod ........................ H04L 67/34

OTHER PUBLICATIONS

Clifford, Damian, and Valerie Verdoodt. "Ad-blocking—the dark side of consumer empowerment: a new hope or will the empire strike back?." BILETA Conference, University of Hertfordshire, Hertfordshire, Apr. 2016. (Year: 2016).\*

\* cited by examiner

SYSTEM AND PROCESS FOR DISPLAYING MEDIA CONTENT FILES IN AN UNBLOCKABLE MANNER

CROSS REFERENCE TO RELATED APPLICATIONS

This application claims benefit of and priority to U.S. Non-Provisional application Ser. No. 15/496,452 filed on Apr. 25, 2017, which claims benefit of and priority to U.S. Provisional Application Ser. No. 62/327,947 filed on Apr. 26, 2016, each of which are incorporated by reference herein in its entirety.

FIELD OF THE INVENTION

The present invention relates to a service, which allows a publisher to show online ads and online media content files, such as video, graphic, audio or text advertisements and combinations thereof, in-spite of presence of ad blocker. The solution works whether the ad blocker is present in user's web browser or on user's computer outside web browser.

BACKGROUND

Online advertising is the sole source of revenue for publishers, who provide free contents to end users. In last couple of years online advertising has become very aggressing where nature of ads have become disruptive and at the same time ads have started consuming lot of bandwidth and thus slowing down time it takes to load a web page.

Above mentioned problems have led to emergence of Ad Blocking technologies, which block ad related html code present on web pages. Ad Blockers are designed for web browser specifically and also designed to be installed in computer so that they can block ads appearing on any application including browsers. Ad blockers typically have three types of rules:
  Specific domains blacklist, any web request on those domains is blocked by Ad Blocker
  There are some generic rules e.g. any request which match wild card based rule for */ads/* will be blocked.
  There are html element specific rules; and if such an html code is found on any web page, its execution will be blocked or it will be hidden from user view.
Any ad server that does not become part of this blacklist ends up showing ads till that ad server becomes part of black list. So there is cat and mouse game.

Traditionally, ad serving business requires specialization and publisher have to take services of some $3^{rd}$ party ad serving companies. Ad serving companies have relationship with various advertisers and thus publisher does not have to establish that one is to one relationship with every advertiser. When a publisher signs up with an ad serving company, it provides html code based on their own domains. As ads are served on various publisher websites using ad tag on same domain of ad serving company, it makes Ad Blockers to easily block ads on all publisher sites using ad tag from same ad serving company by simply adding ad server related domain in black list.

However, Ad Blockers do not block html contents served on publisher domain or sub domains as they may be crucial for functioning of publisher website unless they have website specific such rules.

Considering a single ad server may be providing good ads and at the same time may provide disruptive/bloated ads also, blocking of ad server company related domain results in blanket blockage of ads on publisher site and for that matter on all other publisher web sites using ad tag from same ad server.

SUMMARY

The system of present invention solves problem of publisher explained in previous section. As briefly explained in previous section that online advertising is a specialized domain and publisher has to sign up services of one of online advertising ad serving companies. This arrangement means that publisher gets an ad tag and thus ad related html contents on his website are served from outside publisher domain and if ad serving company domain is blocked, ads on his websites get blocked if user is using ad blocker.

The system of presented invention solves this problem by asking publisher to host a module from solution of presented invention in his web server and also provides a server side script that should be embedded in every web page where publisher is expected to show unblockable ads.

This script provided by solution has to be added by publisher in HEAD tag of every web page where unblockable ads functionality needs to be exposed.

The added script is in the example form <PublisherDomain>/<RandomFilePath>, where time to time random file paths are created on server side and thus even if ad blockers are able to create a block rule, it can become obsolete in next few minutes as paths are generated periodically in web server of every publisher. In case ad blocker is active on web page, this script injects piece of code in those ad slots and makes a call to one of server side script, that was installed by system of presented invention and based on ad slot that server side script gets ad on publisher server side first and then sends same ad to web page. This way ad is not requested directly from web page to ad network but via publisher web server and thus $3^{rd}$ party network domains never appear on web page and thus are hidden from ad blockers. Creation of a random script name on random path, which is based on publisher domain, avoids possibility of Ad Blocker creating a fixed rule set for it and thus bypasses the ad blocker. At the same time all the code related to ad that comes on web page contains random identifiers for html elements and thus even if ad blocker can code in block list previously used html element identifiers, they become obsolete as every display of ad brings html elements on totally random new identifiers. All subsequent scripts created after first call follow the same rule of randomization of script path and thus every call bypasses Ad blocker in similar fashion.

Considering ad serving script is on publisher domain, ad blockers are not likely to block that script while contents of that script are really as provided by solution of presented invention. This avoids using non-publisher domain that serves ads on publisher's web pages.

This embedded script is intelligent enough to detect presence of Ad Blocker and in case Ad Blocker is not present, it does not do anything as ads can be delivered from ad serving company publisher have initial contract in place to show ads.

This way solution only becomes active if ad blocker is present as that's the objective of this service i.e. show ads if ad blocker is present and thus shown ads become unblockable ads.

BRIEF DESCRIPTION OF THE DRAWINGS

The accompanying drawings illustrate various embodiments of the present invention and system and are part of the specification. The illustrated embodiments are merely examples of the present system and invention and do not limit the scope thereof.

DETAILED DESCRIPTION

Figure 1A:
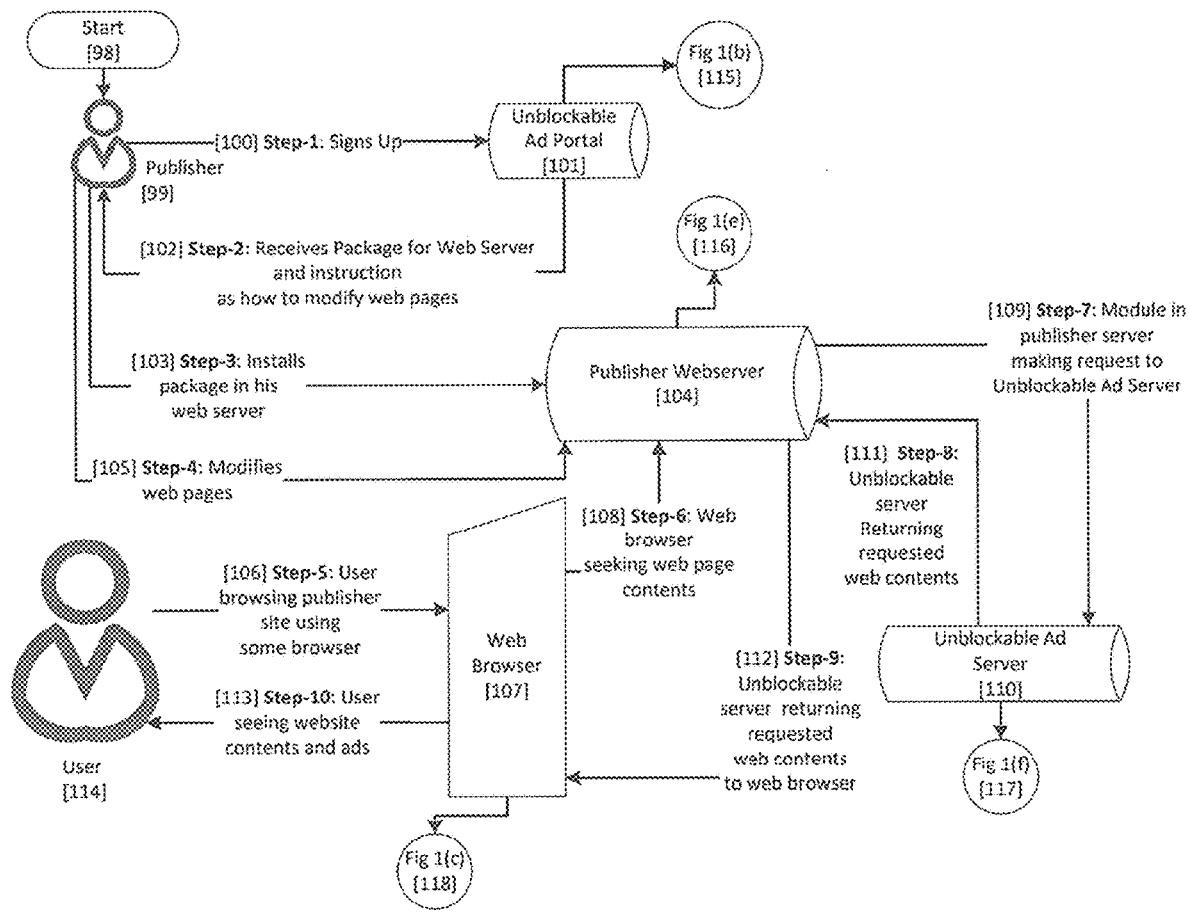
FIG. 1(a) is a schematic illustration defining whole process. Parts of it are covered in detail in subsequent diagrams.

FIG. 1(a) shows 10 steps process showing complete view of the system of presented invention with brief description. The process start [98] with publisher [99] taking 1$^{st}$ step and signing up with portal of presented solution shown as Unblockable Ad Portable [101], which is explained in detail further in FIG. 1(b)[115]. The result of sign up process is that publisher gets a package that he needs to install in his web server as shown in Step-2 [102], additionally he also gets instructions as how to modify web pages upon installation of package on his web server. After publisher gets package as shown in Step-3 [103], publisher installs package received in step-2 in his web server [104] where he has hosted his web site. Publisher's web server is defined in detail in FIG. 1e)[116]. After publisher has installed received package, as shown in Step-4[105], he modifies all web pages in his site as per instructions received in step-2. At this point publisher's web server is ready for unblockable ads solution. In Step-5[106] it is shown that user [114] browses some web page on publisher's site using browser [107], and browser in turn requests contents from publisher web server [104]. Installation package that is provided to publisher, configures the publisher web server in such a way that any requests for ad is auto identified by web server and re-directed to ad server installed server side script, which in turn connects as shown in Step-7 [109] to ad server [110] provided by system of presented invention, and unblockable ad server [110] in turn returns contents back as shown in step-8[111] to publisher web server and from there they get transferred via step-9[112] to web browser[107]. After contents are rendered by web browser for web page, as shown in step-10 [113] user sees those contents. The functionality of Unblockable Ad server [110] is explained in detail in FIG. 1(f) and the functionality of web browser [107] is explained in detail in FIG. 1(c).

Figure 1B:
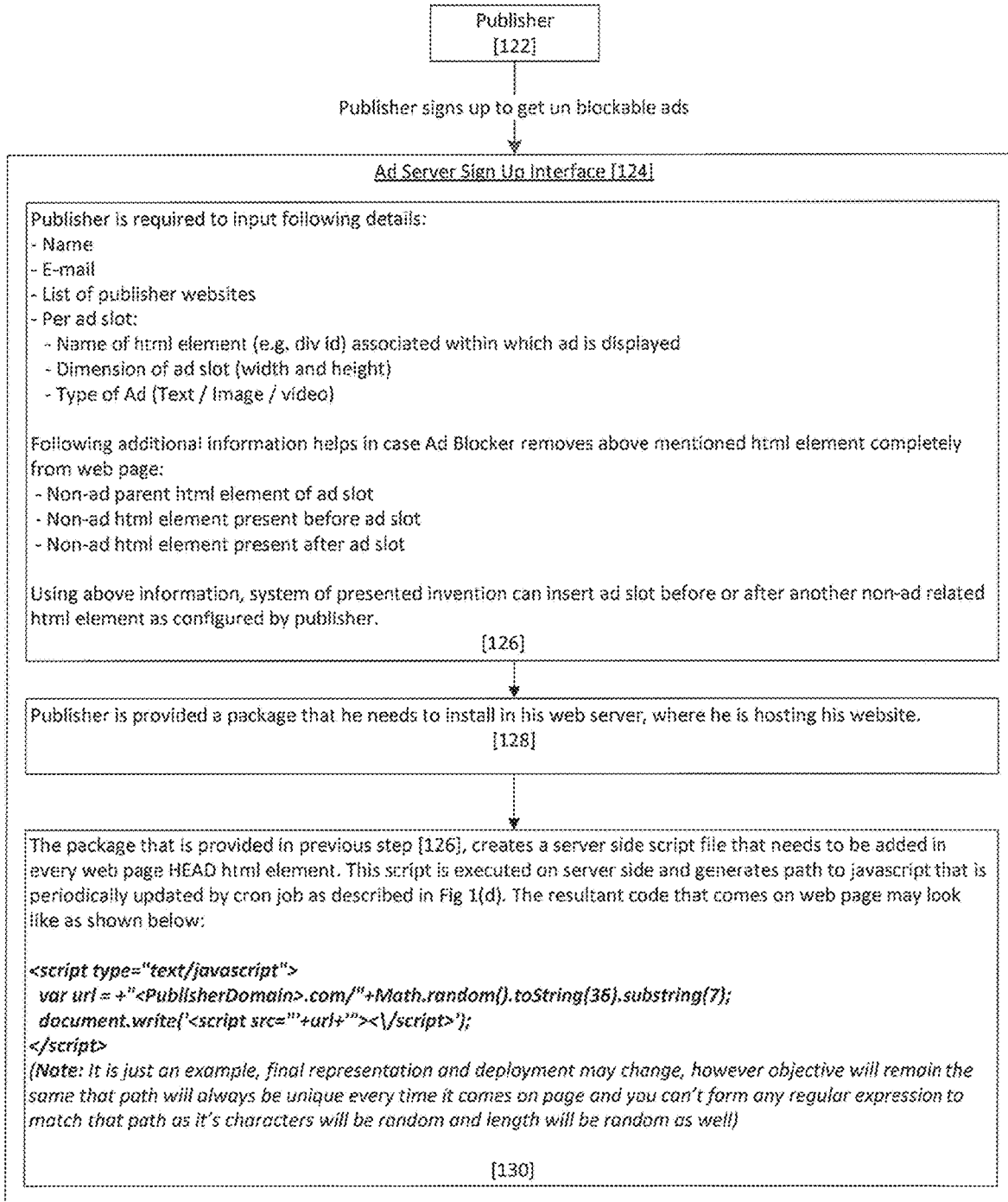
FIG. 1(b) is a schematic illustration showing sign up process, where publisher registers with solution of presented invention.

FIG. 1(b) shows publisher [122] going to portal [124] exposed by system of present invention, where publisher [122] is required to sign up by submitting details indicated in box [126]. Apart from his name, email and list of publisher websites, publisher is expected to submit per ad slot name of html element (e.g. div id/class name etc.) using which ad slot will be identified with their sizes (i.e. width and height) and type (i.e. image/banner/video). In case ad blockers remove the originally placed ad slot itself, publisher is requested to also provide three other html elements relative to ad slot and identified as (i) parent non-ad html element identifier (ii) non-ad html element after which ad slot appears (iii) non-ad html element before which ad slot appears. These three related html elements further allow system of presented solution to identify possible ad slot location on web page and then be able to insert its unblockable ad. This enables solution to find ad slots on publisher page and in case Ad Blocker is present, inserts unblockable ad. Box [128] shows that publisher is provided a package, explained in detail in FIG. 1(d), that he needs to install in his web server where he is hosting website, where publisher expects to make use of unblockable ads functionality. Box [130] shows that publisher is provided further instructions as what piece of server side script code to include in HEAD tag of every web page where publisher wants to make use unblockable ads functionality. The server side script will generate a random script path, which when requested to web server, will be handled by server side code as installed by publisher in box [128] details. Considering ad script is on a random path and that too on publisher domain, ad blockers won't be able to form a fixed or generic rule to catch call of such script and thus system will be able to bring required code on web page and all further calls to server will be created by returning code in similar fashion.

Figure 1C:
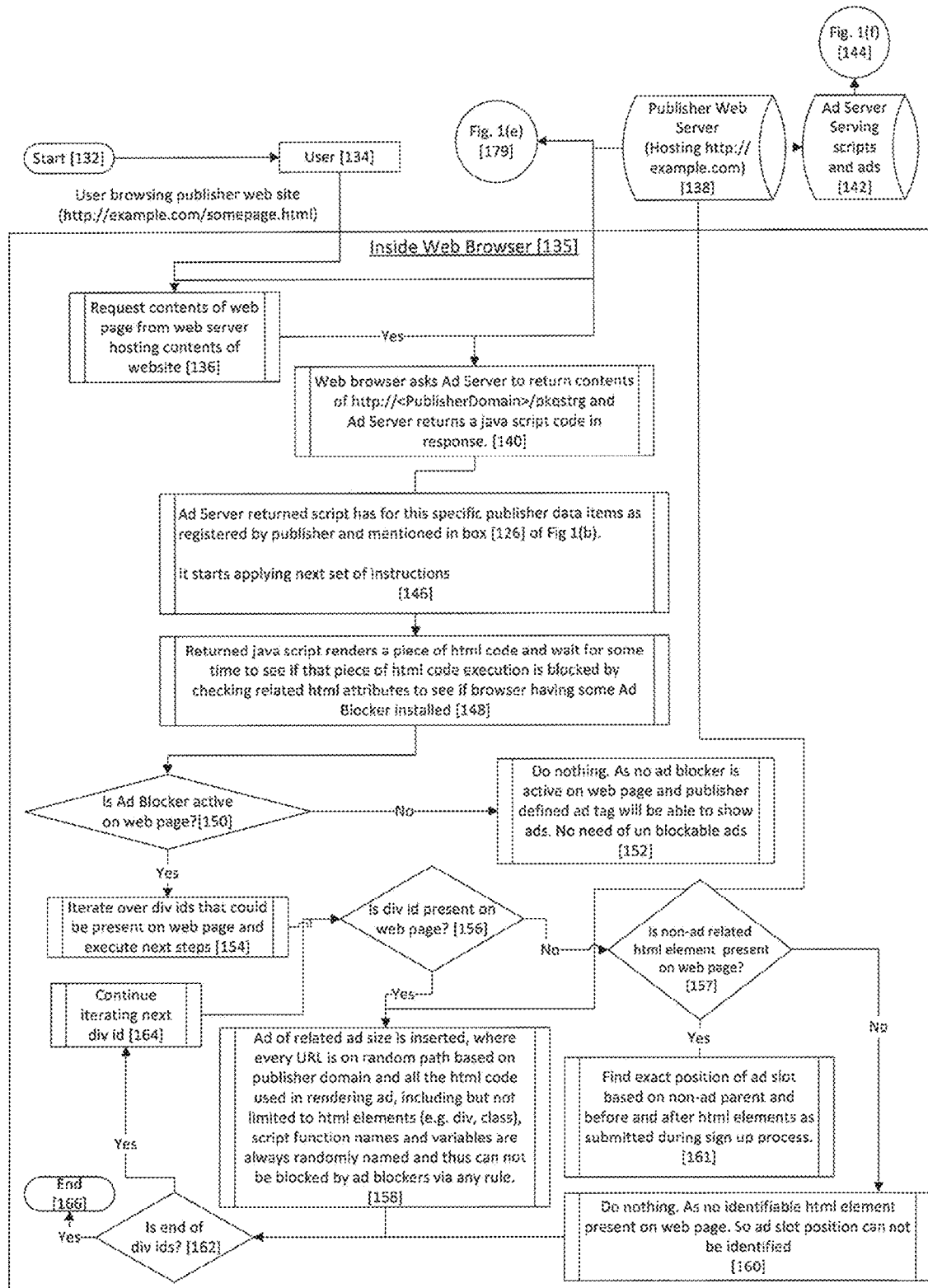
FIG. 1(c) is a schematic illustration showing as what html code, provided by solution of presented invention, does on a web page, when browsed by user.

FIG. 1(c) shows as what transpires inside web browser [135] when a user [134] browses some page (e.g. http://example.com/somepage.html assuming example.com belongs to publisher) on publisher web site. As shown in box [136], web browser requests contents of example web page URL http://example.com/somepage.html from publisher web server [138], which is explained in detail in FIG. 1(e) further. Box [140] shows that returned web page contents are parsed html element by html element and in that process web browser encounters script received from publisher server due to web page including server side code as suggested by solution of presented invention. As described in FIG. 1(b), script has to be added in HEAD tag of web page and it will generate a random path e.g. "<script type="text/javascript"> var url=+"<PublisherDomain>.com/"+Math.random( ).toString(36).substring(7); document.write('<script src="'+ url+'"><\/script>'); </script>". This random path follows logic as understood by web server, where solution of presented invention changes logic every few minutes. Considering a random path is used and that too on publisher domain for script, Ad Blockers can't form rule for such randomly generated paths and thus system of presented solution is able to show ads in-spite of presence of ad blockers. Considering publisher web server has been modified in such a way that it detects and re-directs ad related requests to Ad server of proposed solution, in box [140] when script added in HEAD html tag is requested, it is handled by publisher web server [138], which in turn returns publisher registered per ad slot list of html element ids so that ad slots on publisher page can be identified. After script contents are returned, the first work this script needs to do is check if an Ad Blocker is present on web page or not, as shown in box [148]. In box [150] it is determined if Ad Blocker is active on web page or not, it is done by inserting a known piece of code that is supposed to be blocked by Ad Blocker based on study of ad blocker and if it is determined that Ad Blocker is not present, code does not do anything as shown in box [152] as solution is only applicable for cases when there is ad blocker active on web page else not. If in box [150] it is decided that ad blocker is present, as shown in box [154], it iterates over received html element ids in web page and for each html element id it checks in box [156] if that html element id is present on web page or not, if html element id is not present, in box [157] it further checks if non-ad slot related html elements viz. parent, element before and after ad slot present or not, if not present, it doesn't do anything as related ad slot presence cannot be identified. If in box [156] html element identifiers of ad slot are identified or if in box [157] it is determined that non-ad related html elements as defined by publisher are present, then using those html elements ad slot position is identified and as shown in box [158] ad of related size is inserted, where every URL is on random path based on publisher domain and all the html code used in rendering ad, including but not limited to html elements (e.g. div, class), script function names and variables are always randomly named and thus cannot be blocked by ad blockers via any rule. Injected code in ad slot is served by publisher web server [138], which returns response back to web browser. This way all ads are first fetched on publisher web server [138] side and then returned on publisher's domain to requesting web browser and thus ad blockers cannot block it. In box [162] it is determined if end of html elements using which ad slot needs to be identified have finished, script execution ends [166] else next ad slot's presence on web page is checked.

Figure 1D:
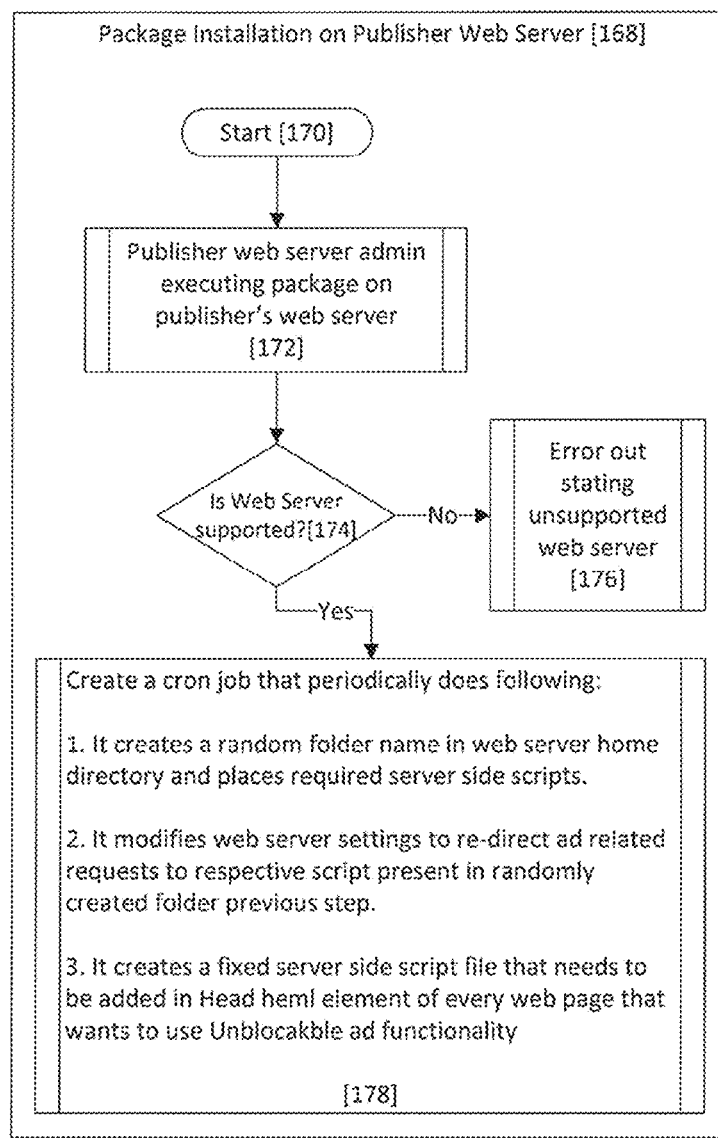
FIG. 1(d) is a schematic illustration of showing installation flow and action done by package, provided by solution of presented invention, when installed on publisher's web server.

FIG. 1d briefly explains what package provided by solution of presented invention does as received by publisher, detailed in box [128] of FIG. 1(b). Package installation starts [170] with admin of publisher's web server executing package [172] in web server, where in box [174] it first checks if publisher used web server type is supported by it or not, if not supported as shown in box [176] it shows error else execution goes to box [178], which explains that package creates a cron job that periodically creates new folder structure and also updates web server specific rules to relay ad related requests to scripts present in randomly generated folder. Additionally, it creates a fixed path to a server side script that can be included in HEAD html tag of every web page, this script is updated by cron job periodically, to sync up with newly created path structure but its relative path is fixed in web server side so that all web pages of publisher site can include it. Considering this script is server side, execution of this script takes place on server side and thus actual logic of random path creation is not exposed.

Figure 1E:
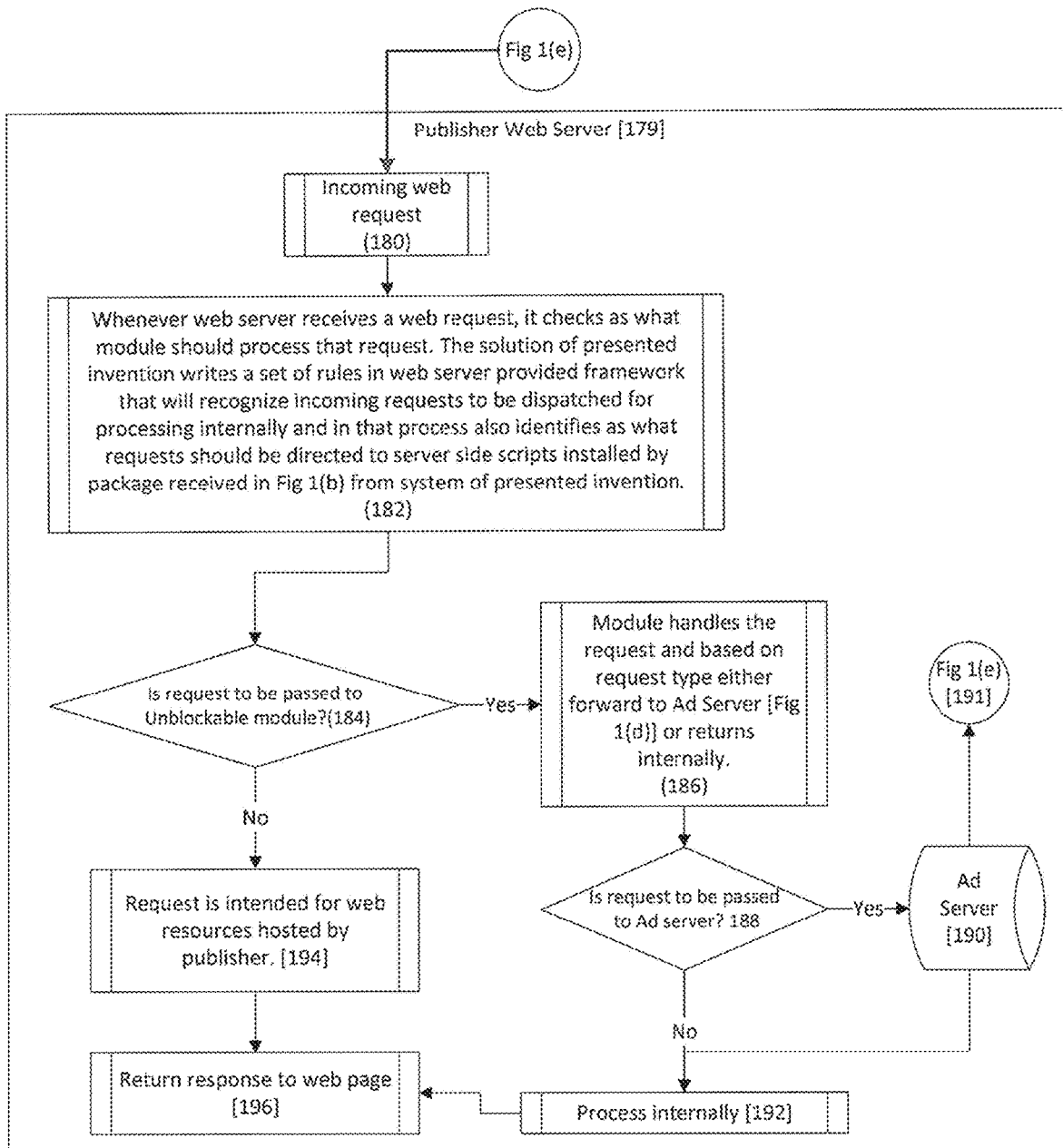
FIG. 1(e) is a schematic illustration showing logic flow inside publisher web server, showing as how scripts provided by system of presented invention come in picture.

FIG. 1(e) explains inner functioning of publisher used web server [179]. Box [180] shows an incoming web request. Box [182] explains that every web server can be configured in a way that a given type of matching requests can be directed to specific server side script. So you can always setup dynamic rules that can relay an incoming request to specific server side script. These rules set are updated by cron job as explained in FIG. 1(d). In box [184] web server checks if incoming request matches the rule set by cron job as explained in FIG. 1(d), if yes, then control is transferred to script of presented solution as shown in box [186]. Scripts of presented solution determine in box [188] if they can process incoming request or they need to relay those requests to Ad Server [190]. If server side scripts provided by solution of presented invention determines that they have to relay that request to Ad server, they make a call to ad server exposed API and return response back to publisher web server, which further relays back to web page as indicated in box [196]. In case incoming request is of type that can be handled by script itself, it processes and response is returned to requesting web page. In all communication back and forth, all involved scripts are on publisher domain with random paths, which are updated by cron job as explained in FIG. 1(d), ad blocker present on user's machine or browser, has no fixed rule set to detect such ad related calls and thus system of presented invention is able to show ads by relaying whole traffic on publisher domain.

Figure 1F:
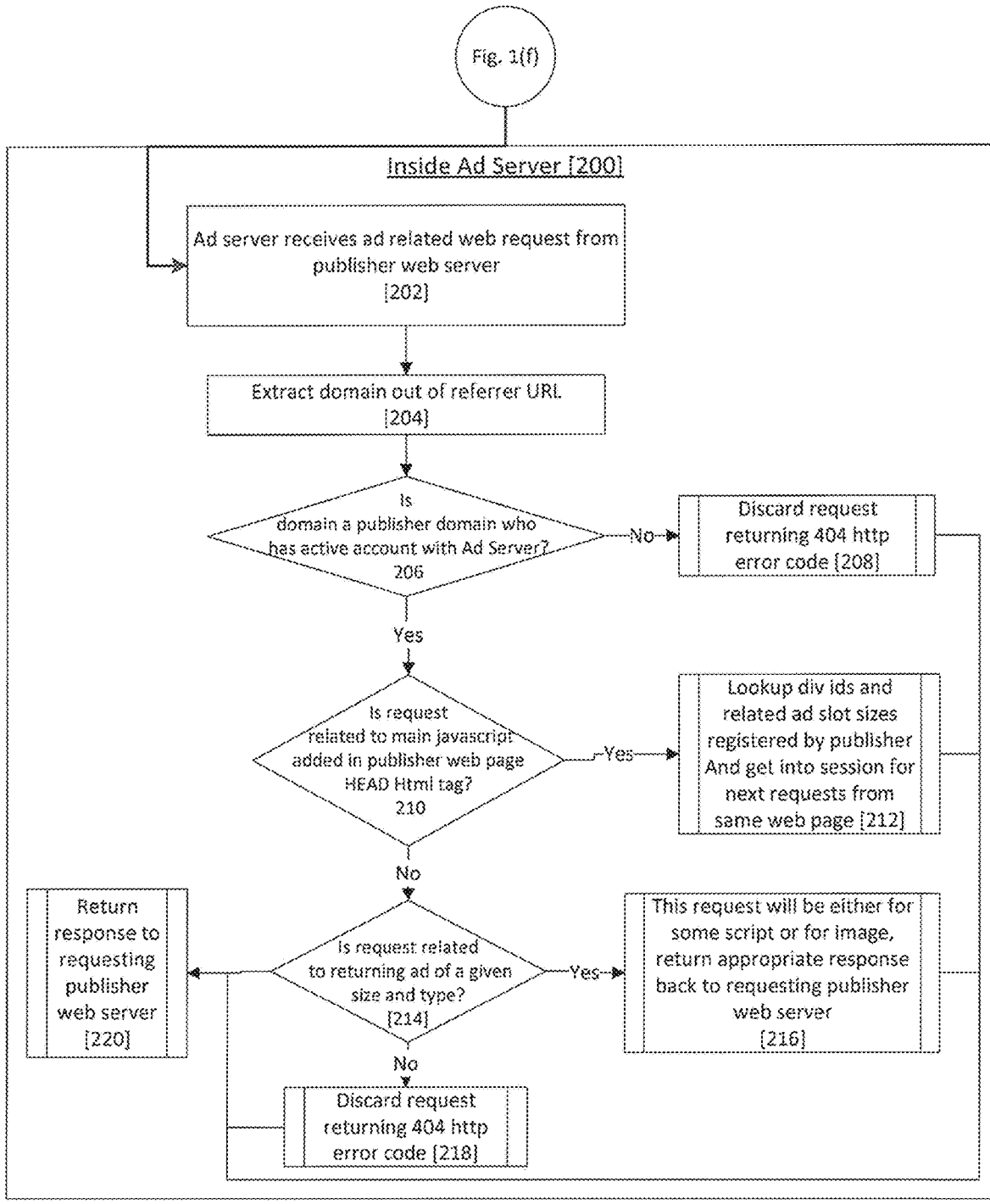
FIG. 1(f) is a schematic illustration showing logic flow inside ad server as used by system of presented invention.

FIG. 1(f) explains inner working of Ad Server [200] of proposed solution. As explained in FIG. 1(e), scripts from system of presented invention are present in publisher web server and depending on need connect to ad server of presented solution to return ads or other required script. Box [202] shows an incoming request to ad server and in box [204] it is determined as who is the publisher. In box [206] it is checked if publisher is a registered publisher or not. If in box [206] it is determined that it is not a registered publisher, execution goes to box [208] where error is returned to requesting publisher web server else execution flow goes to [210], where nature of request is checked, if in box [210] it is determined that request is from script that would have been added in head tag of web page, execution flow goes to box [212] and server returns div elements registered by publisher and related attributes i.e. size and type of ad. In case in box [210] it is determined that request is some other nature, execution flow goes to box [214] and it is checked if request is related to ad, if it is determined in box [214] that request is not defined, it is discarded as shown in box [218] and requesting web server is informed as shown in box [220] else as show in box [216] ad related script or image is served back to calling publisher web server [220].

Figure 2:
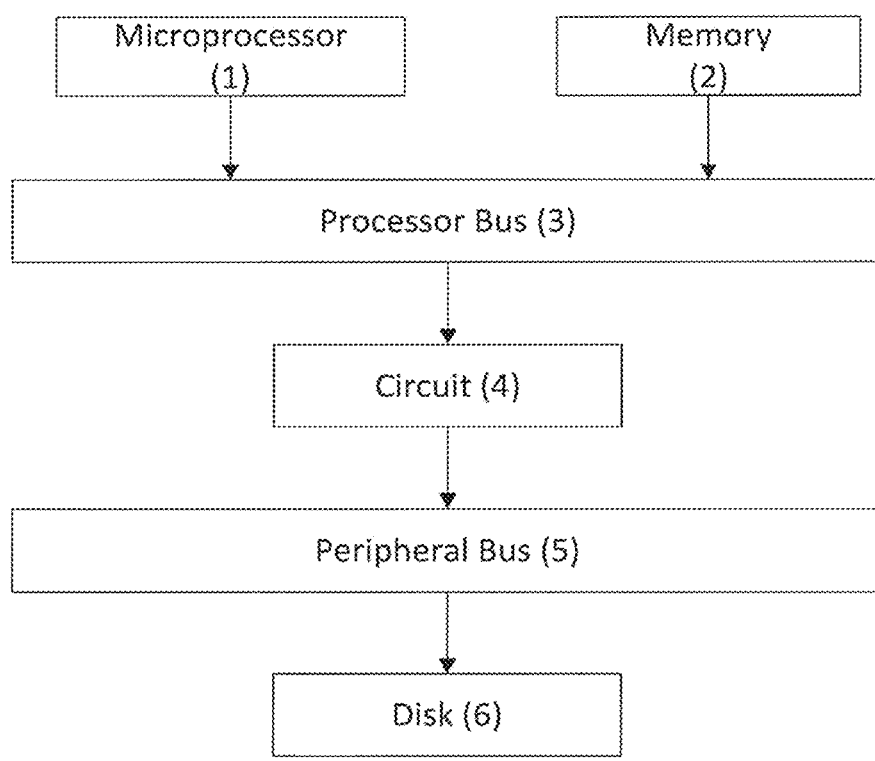
FIG. 2 is a schematic illustration of the connections of a computing system.

FIG. 2 illustrates a system of a computer or device which includes a microprocessor 1 and a memory 2 which are coupled to a processor bus 3 which is coupled to a peripheral bus 5 by circuitry 4. The bus 5 is communicatively coupled to a disk 6. It should be understood that any number of additional peripheral devices are communicatively coupled to the peripheral bus 5 in embodiments of the invention. Further, the processor bus 3, the circuitry 4 and the peripheral bus 5 compose a bus system for computing system 10 in various embodiments of the invention. The microprocessor 1 starts disk access commands to access the disk 6. Commands are passed through the processor bus 3 via the circuitry 4 to the peripheral bus 5 which initiates the disk access commands to the disk 6. In various embodiments of the invention, the present system intercepts the disk access commands which are to be passed to the hard disk.

Figure 3:
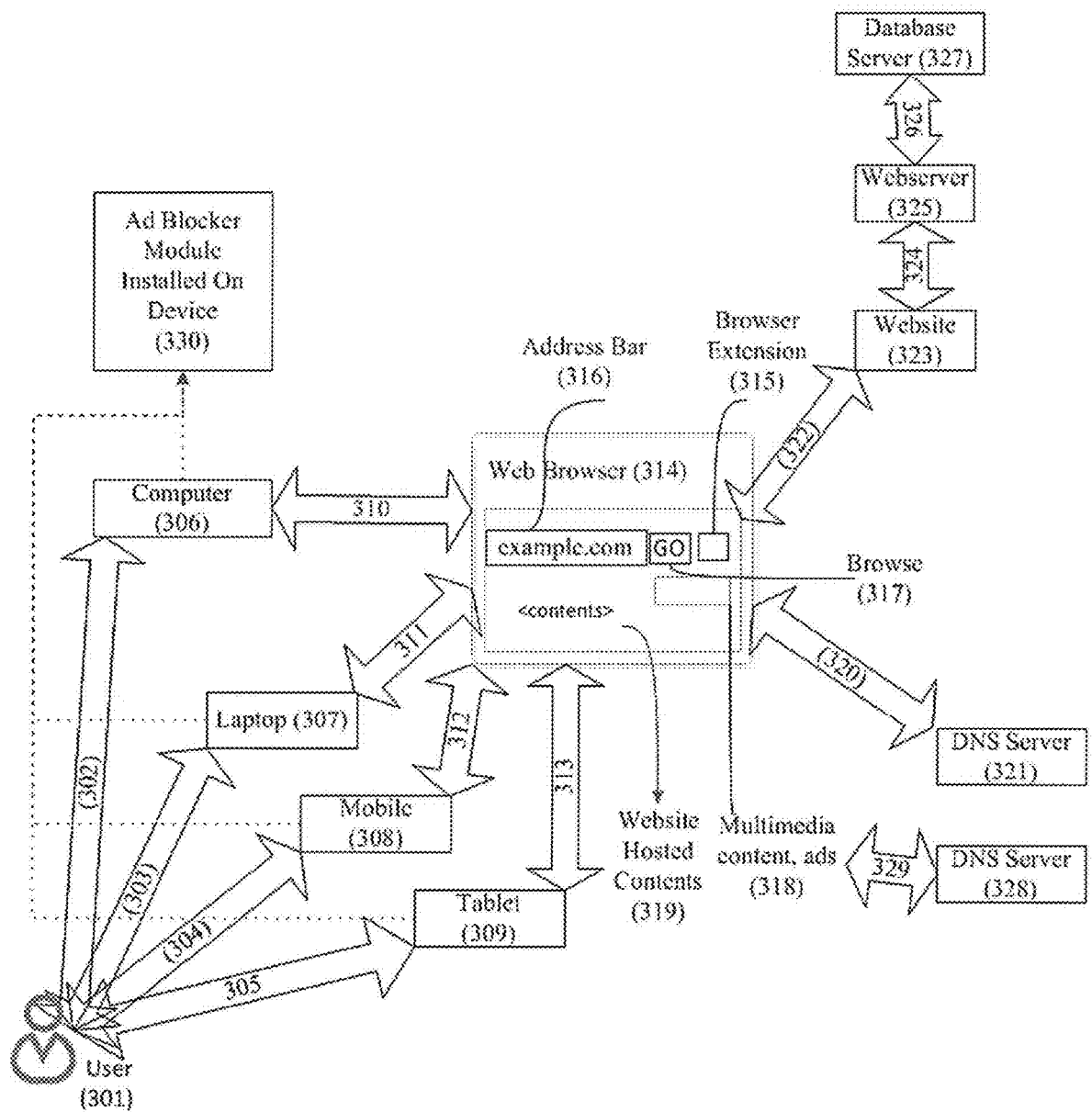
FIG. 3 is a schematic illustration showing how a user browses Internet and how different components act together to complete that browsing experience.

FIG. 3 is a description of how communication works when the web is browsed and shows that a user (301) can use computer (306), laptop (307), mobile (308) or a tablet (309) to launch a web browser (314) installed on that specific device to browse a specific website (323). The user can enter an address of some chosen web site on the address bar (316) and press a browser specific option to indicate to the browser to browse, as shown in FIG. 3 via button "Go" (317). After a user presses a browser specific option to navigate to a given web page as shown in FIG. 3 via button Go (317), web browser (314) first connects to domain name server (321) as configured in that device to resolve the web site domain to the IP address. Any user initiated request in browser page goes through to web site (323) as show via flow arrow 322 and then to web server (325) where web site (323) is hosted. Web server (325) in turn may connect to one or more database server(s) (327) to return specific user requested contents back to web browser (314). Multimedia content and advertisements (318) are received from server 328 as shown by flow arrow 329. In picture Browser Extension (315) is shown to be installed in web browser that has capability to block any outgoing web request; and at the same time can block any html element present on web page using some pre-defined blacklist of outgoing URLs. At the same time a device may also be using one or other Ad blocker (330) installed on device that can block any outgoing call irrespective of application calling and thus such an application can block ad requests originating from any application including web browsers. Considering such ad blockers (330) are installed on device, they have complete access to all code passed onto web page and can inject any specific piece of html code that can block any HTML elements present on web page. Thus depending on device setup, a web request may be blocked at browser level via ad blocker installed as browser extension (315) or may be blocked at network level using software module installed on device at network level and acting as ad blocker (330).

Figure 4:
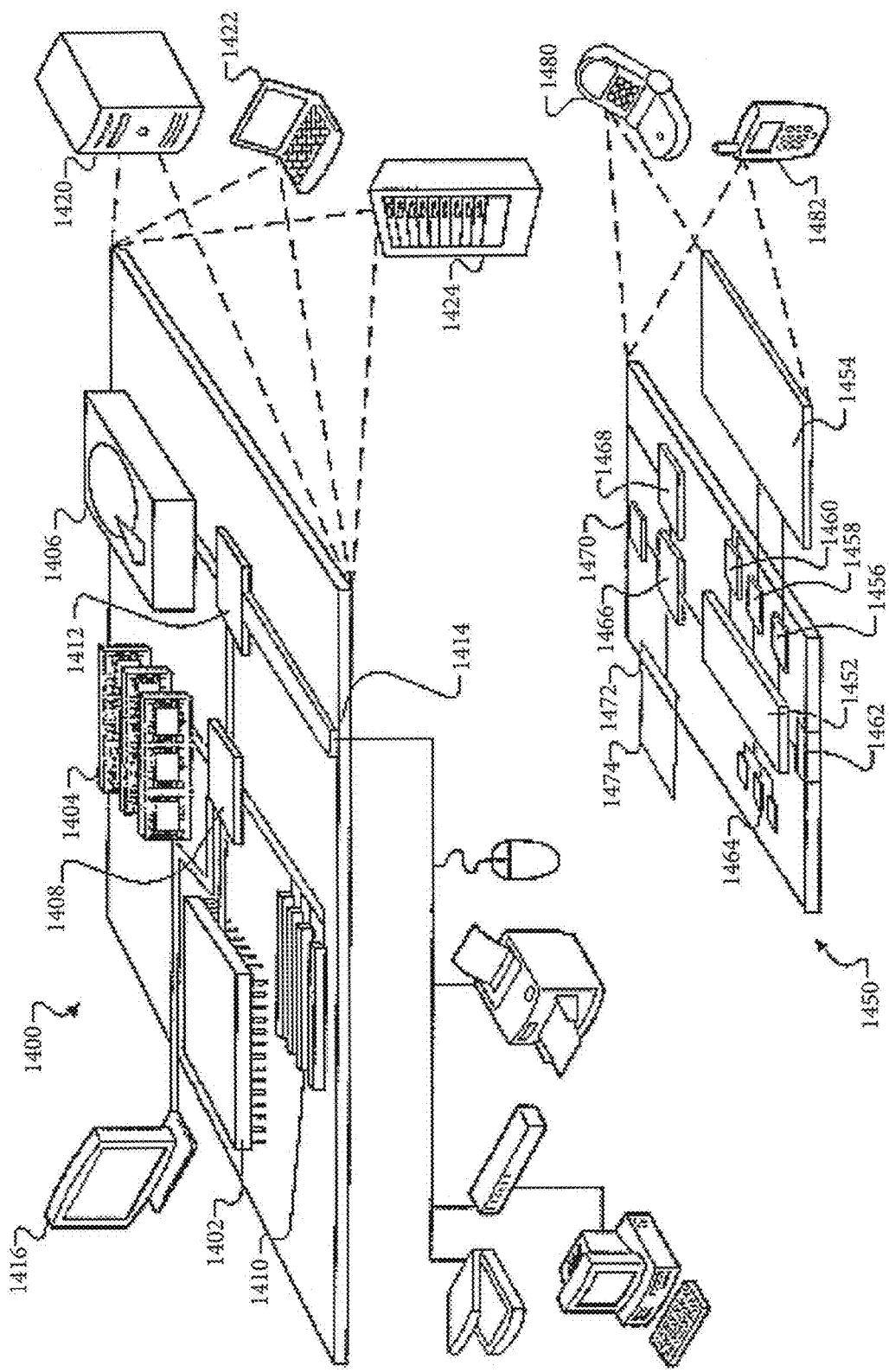
FIG. 4 is an illustration of a computer and mobile devices and their components.

FIG. 4 shows an example of a generic computer device 1400 and a generic mobile computer device 1450, which may be used to implement the processes described herein, including the mobile-side and server-side processes for installing a computer program from a mobile device to a computer. Computing device 1400 is intended to represent various forms of digital computers, such as laptops, desktops, workstations, personal digital assistants, servers, blade servers, mainframes, and other appropriate computers. Computing device 1450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. Each of the components 1402, 1404, 1406, 1408, 1410, and 1412 are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple busses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a volatile memory unit or units. In another implementation, the memory 1404 is a non-volatile memory unit or units. The memory 1404 may also be another form of computer-readable medium, such as a magnetic or optical disk.

The storage device 1406 is capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 1404, the storage device 1406, or memory on processor 1402.

The high speed controller 1408 manages bandwidth-intensive operations for the computing device 1400, while the low speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed expansion port 1414. The low-speed expansion port 1414, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a microdrive or other device, to provide additional storage. Each of the components 1450, 1452, 1464, 1454, 1466, and 1468 are interconnected using various busses, and several of the components may be mounted on a common motherboard or in other manners as appropriate.

The processor 1452 can execute instructions within the computing device 1450, including instructions stored in the memory 1464. The processor may be implemented as a chipset of chips that include separate and multiple analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD (Thin-Film-Transistor Liquid Crystal Display) or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452.

In addition, an external interface 1462 may be provided in communication with processor 1452, so as to enable near area communication of device 1450 with other devices. External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1474 may also be provided and connected to device 1450 through expansion interface 1472, which may include, for example, a SIMM (Single In Line Memory Module) card interface. Such expansion memory 1474 may provide extra storage space for device 1450, or may also store applications or other information for device 1450. Specifically, expansion memory 1474 may include instructions to carry out or supplement the processes described above, and may include secure information also. Thus, for example, expansion memory 1474 may be provided as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1474, memory on processor 1452, or a propagated signal that may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, Wi-Fi, or other such transceiver (not shown). In addition, GPS (Global Positioning System) receiver module 1470 may provide additional navigation- and location-related wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

The computing device 1450 may be implemented in a number of different forms, as shown in the figure. For example, it may be implemented as a cellular telephone 1480. It may also be implemented as part of a smartphone 1482, personal digital assistant, tablet, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "computer readable storage medium" may be any tangible medium (but not a signal medium—which is defined below) that can contain, or store a program. The terms "machine readable medium," "computer-readable medium," or "computer readable storage medium" are all non-transitory in their nature and definition. Non-transitory computer readable media comprise all computer-readable media except for a transitory, propagating signal.

The term "machine-readable signal" refers to any signal used to provide machine instructions and/or data to a programmable processor. A "computer readable signal medium" may be any computer readable medium that is not a computer readable storage medium and that can communicate, propagate, or transport a program.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

What is claimed is:

1. A system for displaying unblockable media content files on web pages, comprising:
   a computer having a processor and memory connected to a processor bus, said processor
   bus connected by circuitry to a periphery bus and a disk;
   said computer operated and in communication with a domain server via a web browser
   wherein a publisher installs a package in a web server hosting a website and said package creates cron job updating a script periodically and creates a fixed path to a server-side script included in a HEAD html tag;
   a server-side code installed by said publisher processes a generated script path requested
   to said web server of said publisher;
   said web browser requests content of a web page from said web server;
   said web browser parses returned html content;
   said web server processes a requested script added in HEAD html tag and said web server returns to said publisher a registered per ad slot list of html elements ids;
   said script provides a piece of a html code to check if an ad blocker is installed;
   said script iterates over div ids present on said web pages wherein said script injects a html code to identify an ad slot position using non-ad related html elements and an ad of
   related size is inserted wherein every URL is on random path based on a domain of said publisher and all said html code used in a rendering ad;
   said web server serves an injected code in an ad slot and returns response to said browser.

2. The system of claim 1 further comprising:
   said web server checks if a request matches a rule set by cron job and determining a module for processing said request;
   an unblockable module processes said request and passes to an ad server;
   said script passing requests to said ad server makes a call to said ad server and returns response to said ad server which relays back to said web page;
   said script processing a request internally returns response to said web page.

3. The system of claim 2 further comprising:
   said ad server receives a request from said web server of said publisher;
   said request for a registered publisher is from script added in a HEAD html tag of said web page of said publisher and said web server of said publisher returns div elements registered by said publisher and related attributes, and if a request for an unregistered publisher returns an error message to said web server of said publisher;
   said request related to returning an ad of a given size and type is for a script or an image and returns appropriate response to said web server of said publisher;
   and wherein said request not related to an ad returns an error message to said server of said publisher.

4. A method for displaying unblockable media content files on web pages, comprising:
   operating a computer and said computer in communication with a domain server via a browser wherein a publisher installing a package in a web server hosting said website and said package creating a cron job updating a script periodically and creating a fixed path to a server-side script included in a HEAD html tag;
   processing by a server side code installed by said publisher a generated script path requested to said web server of said publisher;
   requesting, by a web browser, content of a web page from said server;
   parsing, by said browser, returned html content;
   processing, by said server, a requested script added in HEAD html tag and returning a publisher a registered per ad slot list of html elements ids;
   providing, by as script, a piece of a html code to check if an ad blocker is installed;
   iterating, by said script, over div ids present on web pages and injecting a html code to identify an ad slot position using non-ad related html elements and an ad of related size is inserted wherein every URL is on random path based on a domain of said publisher and all said html code in rendering said ad;
   serving, by said server, an injected code in said ad slot and returning response to said browser.

5. The method of claim 4 further comprising:
   checking, by said web server, if an incoming request matches a rule set by cron job and determining a module for processing said request;
   processing, by an unblockable module, said request and passing to an ad server;
   passing, by a script, requests to said ad server making a call to said ad server and returning response to said ad server;
   processing, by said script, a request internally and returning response to said web page.

6. The method of claim 5 further comprising:
   receiving, by said ad server, a request from said web server of said publisher, said request for a registered publisher is from said script added in a web page HEAD html tag and said publisher web server returning div elements registered by said publisher and related attributes, and if said request is for an unregistered publisher, returning an error message to said server of said publisher:

said request related to returning ad of a given size and type for a script or an image and;

returning an appropriate response to said web server of said publisher, and;

returning an error message to said web server of said publisher if said request is not related to an ad.

\* \* \* \* \*